US010844866B2

(12) United States Patent
Eggers

(10) Patent No.: US 10,844,866 B2
(45) Date of Patent: Nov. 24, 2020

(54) BOX FAN APPARATUS WITH MULTI-ADAPTIVE SUSPENSION

(71) Applicant: Euclid Design Group, LLC, Plano, TX (US)

(72) Inventor: Phillip S. Eggers, Pilot Point, TX (US)

(73) Assignee: Euclid Design Group, LLC, Plano, TX (US)

( * ) Notice: Subject to any disclaimer, the term of this patent is extended or adjusted under 35 U.S.C. 154(b) by 258 days.

(21) Appl. No.: 16/010,012

(22) Filed: Jun. 15, 2018

(65) Prior Publication Data
US 2019/0383295 A1    Dec. 19, 2019

(51) Int. Cl.
| | | |
|---|---|---|
| *F04D 25/08* | (2006.01) | |
| *F04D 29/64* | (2006.01) | |
| *F04D 29/52* | (2006.01) | |
| *F04D 25/02* | (2006.01) | |
| *F04D 25/06* | (2006.01) | |
| *F04D 29/70* | (2006.01) | |
| *F04D 29/54* | (2006.01) | |
| *F04D 29/66* | (2006.01) | |
| *F04D 29/60* | (2006.01) | |
| *F04D 19/00* | (2006.01) | |
| *F16M 13/02* | (2006.01) | |

(Continued)

(52) U.S. Cl.
CPC ............ *F04D 25/088* (2013.01); *E04B 9/006* (2013.01); *F04D 19/002* (2013.01); *F04D 25/022* (2013.01); *F04D 25/06* (2013.01); *F04D 25/0606* (2013.01); *F04D 29/522* (2013.01); *F04D 29/547* (2013.01); *F04D 29/601* (2013.01); *F04D 29/644* (2013.01); *F04D 29/646* (2013.01); *F04D 29/667* (2013.01); *F04D 29/703* (2013.01); *F16M 13/027* (2013.01); *F21V 21/008* (2013.01); *F21V 21/03* (2013.01)

(58) Field of Classification Search
CPC ...... F04D 25/022; F04D 29/005; F04D 29/56; F04D 29/60; F04D 29/66; F21V 21/008
See application file for complete search history.

(56) References Cited

U.S. PATENT DOCUMENTS

| | | | | |
|---|---|---|---|---|
| 2,735,611 A | * | 2/1956 | McLean ................. | F04D 29/646 417/362 |
| 2,746,674 A | * | 5/1956 | Alldritt ................. | F04D 29/646 416/170 R |

(Continued)

*Primary Examiner* — Bryan M Lettman
*Assistant Examiner* — Timothy P Solak

(57) ABSTRACT

A fan apparatus comprises a frame, a central shaft mounted to the frame, and three or more suspension elements formed from a flexible material. Each respective suspension element has a first end, a second end and an adjustment mechanism operable to change a length of the suspension element. The first ends are attached to the frame and the second ends are attached to a ceiling structure to suspend the apparatus. The frame height can be adjusted by changing the lengths of all of the suspension elements by a same amount and the orientation can be adjusted by changing the lengths of the suspension element by different amounts. A blade assembly with central hub and plurality of fan blades is mounted on the shaft, a housing surrounding the blade assembly is mounted on the frame, and an electric motor is operably connected to the central hub rotate the blade assembly.

13 Claims, 6 Drawing Sheets

(51) Int. Cl.
*E04B 9/00* (2006.01)
*F21V 21/03* (2006.01)
*F21V 21/008* (2006.01)

(56) References Cited

U.S. PATENT DOCUMENTS

| | | | |
|---|---|---|---|
| 4,515,538 A | | 5/1985 | Shih |
| 4,657,478 A | * | 4/1987 | LaZebnik ............. F04D 29/646 248/674 |
| 5,085,392 A | * | 2/1992 | Perna ...................... E04B 9/006 248/27.1 |
| 5,435,514 A | * | 7/1995 | Kerr, Jr. .................. E04B 9/006 248/205.1 |
| 5,542,819 A | | 8/1996 | Bucher et al. |
| 6,884,034 B1 | | 4/2005 | Parker et al. |
| 7,210,910 B1 | | 5/2007 | Parker et al. |
| 7,625,186 B1 | * | 12/2009 | Lueddecke ........... F04D 25/088 416/243 |
| 7,726,945 B2 | | 6/2010 | Grant et al. |
| 7,955,055 B1 | | 6/2011 | Boyd et al. |
| 9,151,514 B2 | | 10/2015 | Arnold, III |
| 9,982,679 B2 | | 5/2018 | Santolucito et al. |
| 2006/0177324 A1 | * | 8/2006 | O'Toole .................. F24F 7/007 417/423.1 |
| 2012/0286131 A1 | * | 11/2012 | Arnold, III ............. F24F 13/32 248/674 |

* cited by examiner

BOX FAN APPARATUS WITH MULTI-ADAPTIVE SUSPENSION

TECHNICAL FIELD

The present disclosure relates to the field of fan apparatus for large area cooling and air circulation, and in particular to fan apparatus for mounting on the ceiling structure of a building.

BACKGROUND

Box fans, comprising a motor-powered rotating fan enclosed within a surrounding housing, are well known for circulating air in large areas. When the box fan is intended to sit on the floor or other flat surface, a square or rectangular housing can be used to allow the fan to sit stably. When the box fan is intended for mounting on a stand, wall or ceiling, the housing may be square, rectangular or circular. A box fan having a circular housing can also be called a "drum fan." A circular housing that fits closely around the blade tips can also be called a "shroud." For purposes of this application, unless expressly indicated otherwise, the term box fan is used to encompass fan apparatus having circular housings as well as square or rectangular housings, and the term housing is used to encompass circular shrouds as well as square and rectangular housings.

The air movement capacity of a box fan is typically expressed in terms of volume moved/time, e.g., cubic feet per minute ("CFM"). Some parameters important in establishing the CFM of a box fan are the fan speed and the fan swept area. The fan swept area is the area of a circle defined by the rotating blade tips (the outer diameter or "blade OD") less the area of a circle defined by the rotating blade roots (the inner diameter or "blade ID"). For most box fans, the fan swept area is roughly proportional to the blade OD. Thus, increasing the fan speed increases the CFM for a given blade OD; however, increasing the fan speed typically increases undesirable fan noise and vibration as well. Increasing the blade OD increases the CFM for a given speed; however, increasing the blade OD requires a bigger housing, usually having higher weight and cost.

For circulating air in very large warehouses or other large industrial or agricultural locations, high volume box fans have been developed. The high volume box fans are typically mounted to the ceiling of the building structure and typically have very large diameter blades (large blade OD).

Conventional box fans tend to direct the stream of outlet air in a column extending from the outlet along the (axial) axis of the fan. Although such axial column will naturally diffuse somewhat as it travels away from the outlet, for large diameter ceiling-mounted box fans, the axial column can remain relatively intact until it reaches the floor, resulting in disruptive high air speed and/or turbulence (i.e., blasting) in the area below. A need therefore exists, for a box fan apparatus that provides a diffuse airstream that is not disruptive in an area directly beneath the fan outlet.

Users of large-diameter box fans typically prefer receiving the apparatus in near-ready-to-use to condition to avoid the need for complex assembly. However, large-diameter box fans in near-ready-to-use condition tend to require very large (i.e., high volume) shipping containers, resulting in increased transportation costs. A need therefore exists for a box fan apparatus that requires less shipping volume but can be rapidly used after receipt.

Users of large-diameter box fans often mount the apparatus to the ceiling structure of a building. Since large-diameter box fans can be relatively heavy, rigid metal suspension elements are often used for mounting the fan housing to the ceiling structure. However, such rigid suspension elements can transmit unwanted noise and vibration to the building structure. A need therefore exists, for a box fan apparatus having suspension elements that minimize the transmission of noise and vibration while retaining high weight capacity.

As previously discussed, users of large-diameter box fans often mount the apparatus to the ceiling structure of a building. However, buildings may have many types of ceiling structures, and the structures may be exposed/accessible in some cases and hidden/inaccessible in other cases. Thus, the attachment of rigid fan suspension elements to the ceiling structure can be a difficult task that often requires different types of suspension elements for attachment to different ceiling types and/or permanent alteration of the building structure. A need therefore exists, for a box fan apparatus having suspension elements that are easily adaptive to mounting on multiple types of ceiling structures.

When a large-diameter box fan apparatus is rigidly mounted to the ceiling structure of a building, it can be difficult to adjust or change the orientation of the fan apparatus after installation. A need therefore exists, for a box fan apparatus having suspension elements that are more easily adjustable to change the orientation or outlet direction of the fan apparatus.

SUMMARY

In one aspect, an air-circulating fan apparatus is provided for suspending from a ceiling structure of a building, wherein the ceiling structure defines a ceiling height and a ceiling plane. The fan apparatus comprises a frame and an elongated central shaft mounted to the frame, the central shaft having a central axis defining an axial direction. The apparatus further includes three or more suspension elements formed from a flexible material, wherein each respective suspension element has a respective first end, a respective second end and a respective adjustment mechanism mounted between the respective first and second ends. Each adjustment mechanism is operable to change a length of the respective suspension element between the respective first and second ends. The first ends of the suspension members are attached to respective different portion of the frame. The frame can be suspended from a ceiling structure by attaching the respective second ends of the suspension elements to the ceiling structure. The distance between a ceiling plane and the frame can be adjusted without changing the orientation of the central axis relative to the ceiling plane by using the respective adjustment mechanisms to change the respective lengths of all of the respective suspension elements by a same amount. The orientation of the central axis relative to the ceiling plane can be adjusted without changing the distance between the ceiling plane and the frame by using the respective adjustment mechanisms to change the respective lengths of each of the respective suspension elements by respective different amounts. A blade assembly is mounted on the central shaft to be rotatable around the central axis, and defines a turning direction and an air flow direction. The blade assembly includes a central hub mounted on the central shaft for rotation around the central axis in the turning direction and a plurality of fan blades rigidly mounted to the central hub and extending radially away from the central axis. Each fan blade has a front blade surface facing in the air flow direction and a rear blade surface facing opposite to the air flow direction. The front blade surface is bounded by a blade root disposed along a radially innermost edge of the blade, a blade tip disposed along a radially outermost edge of the blade, a leading edge extending between the blade tip and the blade root along the turning direction edge of the blade and a trailing edge extending between the blade tip and the blade root along an edge opposite the turning direction edge. An electric motor is mounted to the frame and operatively connected to the central hub to rotate the rotating blade assembly around the central axis. A cylindrical housing is mounted to the frame with a front edge facing in the air flow direction, a rear edge facing opposite to the air flow direction. When viewed in the axial direction, an inner surface of the housing has a circular cross-section having a center located on the central axis. At least a portion of the fan blades extends past the front edge of the housing in the axial direction, and the greatest axial extension of the blades defines a blade protrusion distance.

In one embodiment, each suspension element includes a first loop formed on the respective first end and a second loop formed on the respective second end.

In another embodiment, the suspension elements are primarily formed from a woven synthetic fiber material.

In yet another embodiment, the electric motor is operatively connected to the central hub by a flexible belt.

In still another embodiment, the fan apparatus further comprises a reversible motor mount plate connected to the electric motor and connectable to the frame in one of two configurations. When the reversible motor mount plate is connected to the frame in the first configuration, the electric motor extends axially a first distance from the rear edge of the housing and the electric motor is positioned to not interfere with rotation of the blade assembly. When the reversible motor mount plate is connected to the frame in the second configuration, the electric motor extends axially a second distance from the rear edge of the housing, wherein the second distance is less than the first distance, and the electric motor is positioned to interfere with rotation of the blade assembly.

In a further embodiment, the cylindrical housing further comprises a central portion having a first axial length wherein the inner wall lies at a constant first radius from the central axis. A rear lip portion is connected to a rear edge of the central portion, the rear lip portion extending radially from the first radius to a second radius, wherein the second radius is greater than the first radius. A flare portion is connected to a front edge of the central portion, the flare portion extending, when viewed in cross section along a plane through the central axis, axially frontward a second axial length and radially outward at an angle within the range from 43 degrees to 47 degrees from the front edge of the central portion to a third radius, wherein the third radius is greater than the first radius.

In a still further embodiment, the first axial length of the central portion of the housing is in the range of 10 inches to 11 inches; and the second axial length of the flare portion is in the range from 1.9 inches to 2.1 inches.

In another embodiment, the blade clearance distance is within the range from 0.25 inches to 1.00 inches; and the blade protrusion distance is within the range from 1.00 inches to 1.25 inches.

In yet another embodiment, the first radius of the central portion, the first axial length of the central portion, the second axial length of the flare portion, the blade clearance distance and the blade protrusion distance cause a funnel shape outlet air flow pattern that travels outward from the front edge of the housing at an angle relative to the central axis within the range from 43 degrees and 47 degrees.

In still another embodiment, the frame is configured to have three or more frame arms of equal length, each frame arm extending radially from an inner end proximal to the central axis to an outer end distal from the central axis. Each respective suspension element is connected to a different one of the three or more frame arms at a respective point on the frame arm proximal to outer end of the frame arm. The housing is connected to the frame only at the outer ends of the frame arms.

In a further embodiment, the frame includes three frame arms configured in a three-pointed star shape and there are three suspension elements.

In a yet further embodiment, the frame includes four frame arms configured in a cross shape and there are four suspension elements.

In another aspect, an air-circulating fan apparatus for suspending from a ceiling structure of a building is provided, wherein the ceiling structure defines a ceiling height and a ceiling plane. The fan apparatus comprises a frame having four frame arms joined at respective inner ends and extending to respective outer ends in a cross configuration. An elongated central shaft is mounted to the frame proximal to the inner ends of the frame arms, the central shaft having a central axis defining an axial direction. A blade assembly is mounted on the central shaft to be rotatable around the central axis, and defines a turning direction and an air flow direction. The blade assembly includes a central hub mounted on the central shaft for rotation around the central axis in the turning direction and a plurality of fan blades rigidly mounted to the central hub and extending radially away from the central axis. An electric motor is mounted to the frame and operatively connected to the central hub to rotate the blade assembly around the central axis. A cylindrical shroud is mounted to the outer ends of the frame arms, the shroud including a front edge facing in the air flow direction, a rear edge facing opposite to the air flow direction. When viewed in the axial direction, the housing has an inner surface with a circular cross-section having a center located on the central axis. A central portion has a first axial length wherein the inner wall lies at a constant first radius from the central axis. A flare portion is connected to a front edge of the central portion, the flare portion extending, when viewed in cross section along a plane through the central axis, axially frontward a second axial length and radially outward at an angle within the range from 43 degrees to 47 degrees from the front edge of the central portion to a third radius, wherein the third radius is greater than the first radius. At least a portion of the fan blades extends past the front edge of the housing in the axial direction. Four suspension elements are formed from a flexible material, wherein each respective suspension element has a respective first end attached to a different one of the four frame arms, a respective second end and a respective adjustment mechanism mounted between the respective first and second ends. Each respective adjustment mechanism is operable to change a length of the respective suspension element between the respective first and second ends. The frame can be suspended from a ceiling structure by attaching the respective second ends of the suspension elements to the ceiling structure, and the distance between a ceiling plane and the frame can be adjusted without changing the orientation of the of the central axis relative to the ceiling plane by using the respective adjustment mechanisms to change the respective lengths of all of the respective suspension elements by a same amount. The orientation of the central axis relative to the ceiling plane can be adjusted without changing the distance between the ceiling plane and the frame by using the respective adjustment mechanisms to change the respective lengths of each of the respective suspension elements by respective different amounts.

In one embodiment, the profile of each fan blade includes a widened tip exhibiting the following variation of chord length with increasing radial distance from the blade root: The chord length increases to a first local maximum as the radial distance increases. After the first local maximum, the chord length decreases to a local minimum as the radial distance continues to increase. After the first local minimum, the chord length increases again to second local maximum proximal to the blade tip as the radial distance continues to increase.

BRIEF DESCRIPTION OF THE DRAWINGS

For a more complete understanding, reference is now made to the following description taken in conjunction with the accompanying Drawings in which.

DETAILED DESCRIPTION

Figure 1:
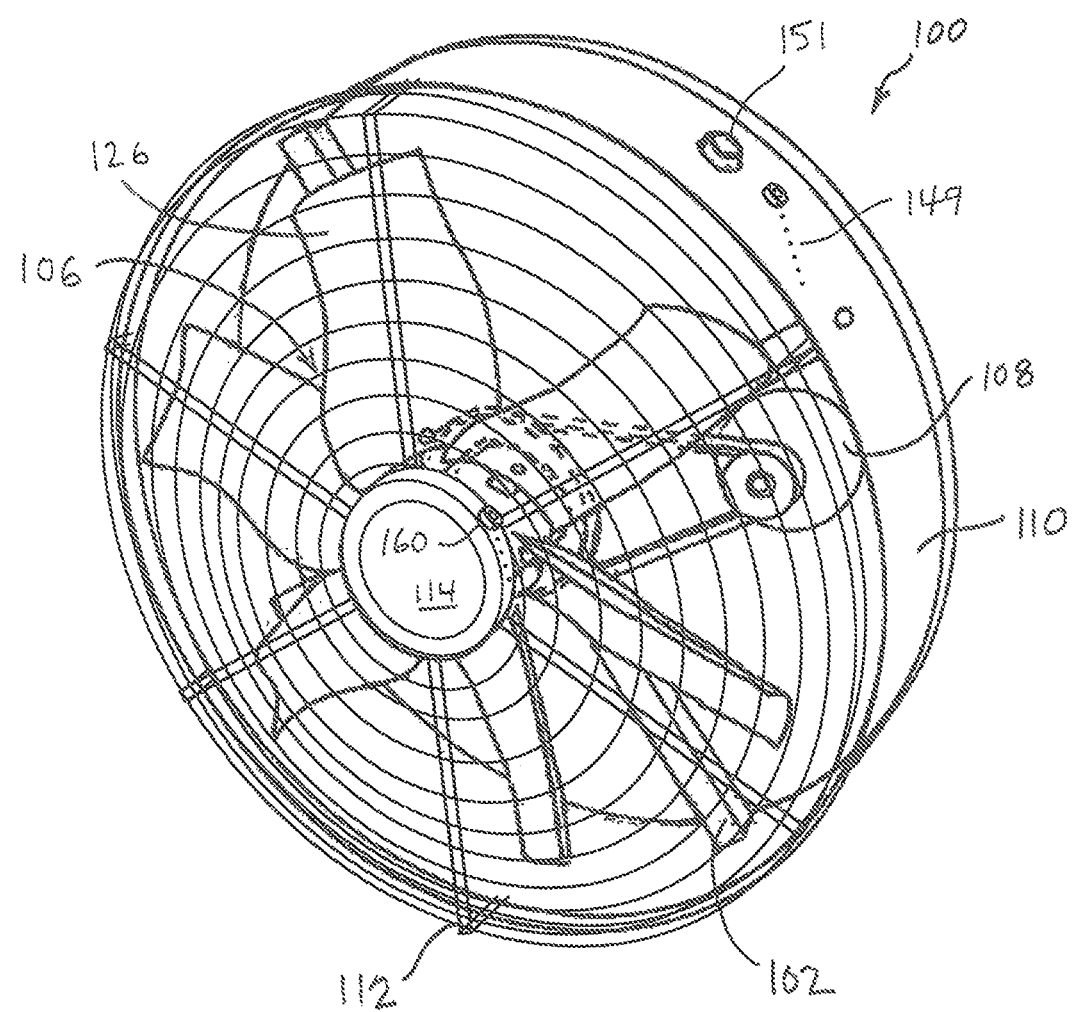
FIG. 1 shows a front perspective view of an exemplary box fan apparatus in accordance with the disclosure.

Referring now to the drawings, wherein like reference numbers are used herein to designate like elements throughout, the various views and embodiments of a box fan apparatus with multi-adaptive suspension are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The box fan apparatus disclosed herein are a high volume ceiling fans, made to address and withstand the extreme conditions of agricultural and industrial applications. The belt-driven fans are designed to move a huge amount of air quietly, be easy to install, and have a long life cycle. These fans hang from the ceiling so they do not consume floor space, and they provide a more even airflow to cool large areas efficiently.

In some embodiments, the disclosed fan apparatus includes a round (i.e., circular) shroud enclosure having a special shape to provide multiple benefits. A shrouded fan is a much more efficient fan, as demonstrated with many studies, and the fact that serious cooling demands utilize shrouded fans (power plants, HVAC, automobile radiator fans, etc.). The shroud forces the air to move forward rather than off the tip of the blades. The design of shroud provides needed rigidity. For example, the lip on the back of the shroud turns to 90 degrees, which provides resistance to flexing in or out from the blade structure. Further, the flare on the front of the shroud turns to about 45 degrees, which provides resistance to twisting and horizontal warping. These two shapes work together to provide a highly rigid round/circular shroud, which is critical for blade clearance and efficiency purposes. In some embodiments, the blades to have a gap of about ½ inch from the shroud, as this gap dictates efficiency and noise levels. The shroud is formed to remain true to a circle shape. Furthermore, the blades protrude from the front of the shroud slightly to allow for a funnel-shaped airflow, so the 45 degree flare on the front of the shroud allows this airflow shape to form. Lastly, the front protective screen is attached to the shroud in various locations.

In some embodiments, the disclosed fan apparatus include blades that are made of stainless steel and polished for appearance and efficiency. The shape of the blades is designed to move consistent amounts of air throughout the chord of the blade, with a greater angle of attack closer to the hub than at the middle section. There is a widened tip of the blade which helps to funnel the airflow, as previously discussed. Also, the blades can be grooved for stiffness/rigidity to prevent flexing and metal fatigue, as well as reduce noise from vibration.

In some embodiments, the disclosed fan apparatus produce a funnel-shaped outlet airflow pattern which spreads the air movement in a wide area, rather than simply a straight column of air like a normal drum fan. This funnel shape provides air circulation and/or cooling without excessive blasting to the area directly below it, and it also promotes the dispersion of the air when it hits the floor at an angle and continues across the floor to expand the cooling area. The funnel-shaped outlet airflow pattern can be produced by: 1) positioning the frame onto the shroud so that the blades protrude slightly from the front of the shroud; 2) shaping the shroud with a 45 degree leading edge; and 3) forming each blade with a unique extended chord at the tip to accelerate the airflow.

In some embodiments, the disclosed fan apparatus includes a frame that is a cross-shaped steel structure with four arms extending out to the shroud. This frame provides the center mounting for the blade and pulley structure, with highly rigid qualities. The frame is bolted onto the shroud in four places, which helps to support the shroud and unify the entire structure. Near the end of each arm where it attaches to the shroud is an eyebolt for connecting the hanging strap, which then is connected to the ceiling structure. This eyebolt mounting supports the weight of the fan without any twisting force upon the shroud or blade structure. The frame also serves as the motor mounting system, as it has two holes drilled to accept a flat motor mount plate which has the motor fastened to it. The mount plate has elongated holes to allow sliding to tighten the drive belt. In addition, the mount can be installed backwards onto the frame, to place the motor inside of the fan unit for shipping. Lastly, the rear protective screen is attached to the frame in various locations.

In some embodiments, the disclosed fan apparatus has a circular shroud with a diameter within the range from 24 inches to 60 inches. Some of these embodiments include a one-speed electric motor, other embodiments include a two-speed electric motor and still other embodiments include a variable-speed electric motor. In some embodiments having the two-speed motor, a pull-chain switch on the side of the shroud is provided to select motor speeds. In some embodiments having the variable-speed motor, a rotary switch on the side of the shroud can be provided to select motor speeds. In some embodiments, a light assembly can be mounted at the center of the front screen. The light assembly can include LED, halogen, fluorescent or incandescent bulbs, and can be electrically connected to a pull-chain switch mounted on the shroud next to the motor control switch. In some embodiments, the fan apparatus can further include an electrical power cord extending from the housing with a standard prong connector.

In some embodiments, the disclosed fan apparatus includes suspension elements that are adaptable to multiple mounting circumstances. In one embodiment, the suspension elements include four nylon suspension straps, looped on each end, attached to the eyebolts on the fan frame. The nylon straps are oversized to easily handle the load of a fan with overall weight in the range from 50 pounds to 130 pounds. Each nylon suspension strap has a load capacity of at least 1600 pounds. The straps are attached to the ceiling as desired by the installer, and may include wrapping the strap around a beam/joist/cable and then through its own loop, or with eyebolts attached to the ceiling structure. The use of nylon suspension straps minimizes the transfer of vibration/noise to the ceiling structure, makes it easier for installation, and reduces cost.

In some embodiments, the disclosed fan apparatus includes a protective screen (or "grille") on the front and/or rear side. In some embodiments, the screens are formed of wires/bars crossing over one another with gaps between the bars less than ½ inch to comply with OSHA regulations (e.g., when intended for installation close to the floor). In other embodiments, the screen of the fan apparatus can have larger gaps (e.g., when intended for installation higher from the floor). In some embodiments, the screens can be mounted to the frame on the rear, and to the shroud on the front.

Figure 2:
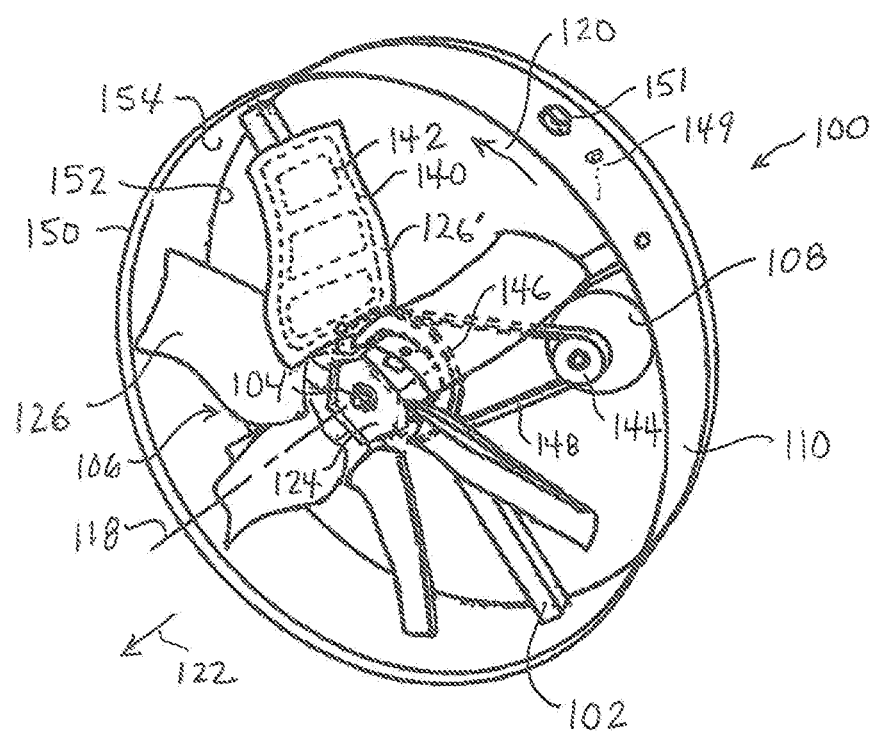
FIG. 2 shows the box fan apparatus of FIG. 1 with the grille and light assembly removed to further illustrate interior components.
Figure 3:
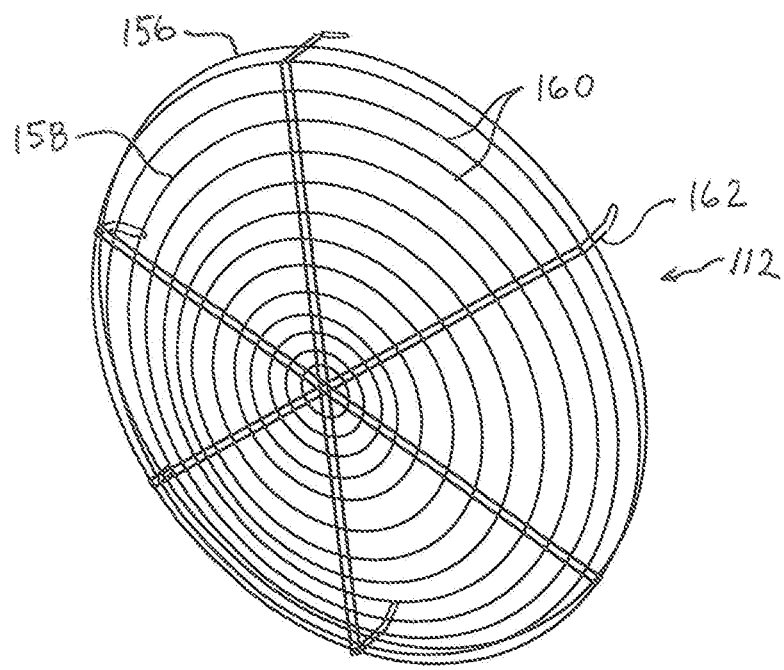
FIG. 3 shows the grille of the box fan apparatus of FIG. 1.

Referring now to FIGS. 1-3, there is illustrated an exemplary box fan apparatus in accordance with one aspect of the current invention. The fan 100 is suitable for suspending from a ceiling structure of a building for the circulation of air. The fan apparatus 100 includes a frame 102, a central shaft 104, a blade assembly 106, an electric motor 108, a housing (or "shroud") 110, a protective front grille 112 and a light unit 114. FIG. 1 illustrates the fan 100 in assembled configuration, FIG. 2 shows the fan with the protective grille 112 and light unit 114 removed for purposes of illustration, and FIG. 3 shows the grille 112 alone. The fan 100 can also have a protective rear grille mounted on the rear side of the frame, but the rear grille is not illustrated for purposes of clarity. Further, in FIGS. 1 and 2, the clearance (i.e., radial spacing) between the blade tips and the adjacent housing may be exaggerated for purposes of illustration.

The frame 102 provides structural support for the various components of the fan 100, and thus is preferably made from rigid material to support loads and resist flexing. In some embodiments, the frame 102 is formed from metals such as steel or aluminum. In some embodiments, the frame 102 includes three or more frame arms 116 joined together at respective inner ends and extending to respective outer ends. In the illustrated embodiment, the frame 102 includes four frame arms 116 connected in a cross configuration. In other embodiments, the frame 102 can includes three frame arms 116 connected in a three-pointed star configuration, five frame arms connected in a five-pointed star configuration, or any number of frame arms configured in a N-pointed star configuration, where N is the number of frame arms.

As best seen in FIG. 2, the central shaft 104 is mounted to the frame 102 and has a central axis 118 defining an axial direction (i.e., parallel to the central axis) and a radial direction (i.e., perpendicular to the central axis). The blade assembly 106 is mounted on the central shaft 104 to be rotatable around the central axis 118 and defines a turning direction (i.e., direction of rotation), denoted by arrow 120, and an air flow direction, denoted by arrow 122. The blade assembly 106 includes a central hub 124 and a plurality of fan blades 126. The central hub 124 is mounted on the central shaft 104 for rotation around the central axis 118 in the turning direction 120. The plurality of fan blades 126 are rigidly mounted to the central hub 124 and extend radially away from the central axis 118. Each fan blade 126 has a front blade surface 128 facing in the air flow direction and a rear blade surface 130 facing opposite to the air flow direction. The front blade 128 surface is bounded by a blade root 132 disposed along a radially innermost edge of the blade, a blade tip 134 disposed along a radially outermost edge of the blade, a leading edge 136 extending between the blade tip and the blade root along the turning direction edge of the blade and a trailing edge 138 extending between the blade tip and the blade root along an edge opposite the turning direction edge.

The fan blades 126 are preferably made from rigid material to support loads and resist flexing and vibration. In some embodiments, the fan blades 126 are formed from metals such as steel, stainless steel or aluminum. In other embodiments, the fan blades 126 are formed of rigid plastic materials or composite materials such as fiberglass/epoxy composite or carbon-fiber/epoxy composite. In some embodiments, the fan blades 126 can include peripheral grooves 140 and/or interior grooves 142 (shown in broken line) to increase the rigidity of the blades. In FIG. 2, the grooves 140 and 142 are shown only on exemplary fan blade 126' for purposes of clarity; however, the grooves are typically placed on all fan blades 126 uniformly.

The electric motor 108 is mounted to the frame 102 and operatively connected to the central hub 124 to rotate the blade assembly 106 around the central axis 118. In the illustrated embodiment, the electric motor 108 and the central hub 124 include respective pulleys 144 and 146 connected by a flexible drive belt 148. In other embodiments, the electric motor 108 can be connected to the central hub 124 by a different drive mechanism or can be directly connected. The electric motor 108 can be a single-speed electric motor, a two-speed electric motor or a variable-speed electric motor. In the illustrated embodiment, the electric motor 108 is a two-speed motor controlled for on/off function by a pull-chain switch 149 mounted on the housing 110 and controlled for speed selection function by a rotary knob 151 also mounted on the housing. In other embodiments, the on/off function and/or speed selection (if applicable) can be controlled by remote switches.

The housing or shroud 110 can be mounted to the frame 102 with a front edge 150 (defining an air outlet) facing in the air flow direction 122, a rear edge 152 (defining an air inlet) facing opposite to the air flow direction and an inner surface 154 facing the central axis 118. In the illustrated embodiment, the housing 110 has a cylindrical configuration with a circular cross-section (or series of circular cross-sections) when viewed in the axial direction, with the circular cross-sections having centers located along the central axis 118. At least some of the blade assembly 106 is axially positioned within the housing 110. In the illustrated embodiment, portions of the fan blades 126 extend axially past the front edge 150 of the housing 110.

Figure 4:
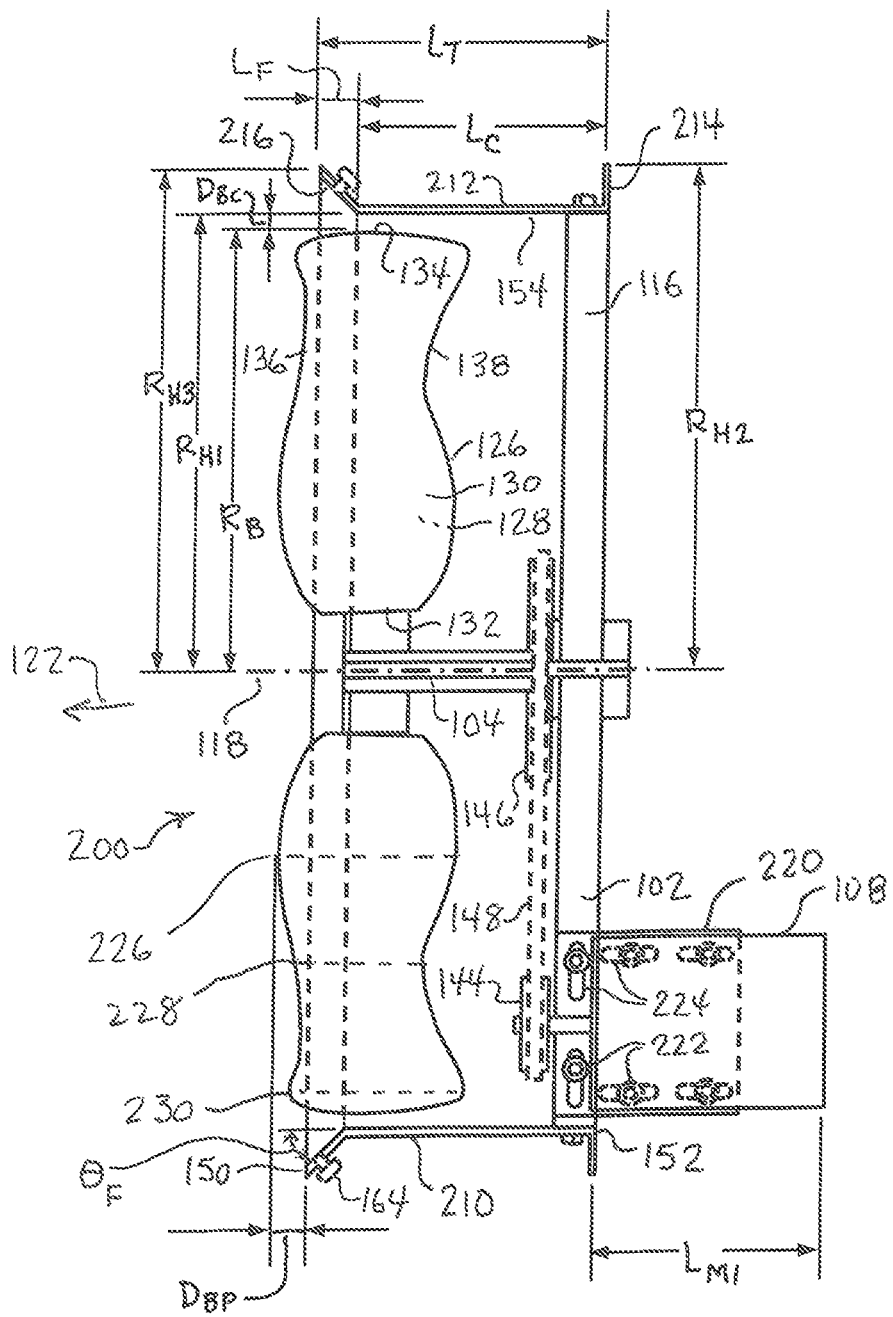
FIG. 4 shows a cross-sectional side view of another exemplary box fan apparatus in accordance with the disclosure.

As best seen in FIG. 3, the grille 112 is formed of metal wire, molded plastic or other suitable materials. In the illustrated embodiment, the grille 112 comprises a series of concentric circular wires 160 supported by radial bars 162. The radial bars 162 are configured to fit around the front edge of the housing 110 for attachment with fasteners 164 (FIG. 4). The grille 112 is typically attached to the housing 110, but can alternatively be attached to the frame 102 or another structure. The grille 112 is positioned over the air outlet of the housing 110 to keep objects (for example, fingers or clothing) from contacting the blade assembly 106. In embodiments wherein portions of the fan blades 126 extend axially past the front edge 150 of the housing 110, the grille 112 can include a first portion 156 of substantially constant diameter extending axially to clear the fan blades and then a second portion 158 extending laterally (i.e., generally radially) across the air outlet to cover the blade assembly 106. A rear grille (not shown) can be attached to the frame 102 or housing 110 on the rear of the fan 100 to cover the air inlet.

The light unit 114 is an optional element that can be included on the fan apparatus 100, but is not required. The light unit 114 can include LED, fluorescent, halogen or incandescent bulbs. The light unit 114 can be mounted to the exterior of the grille 112 and powered by electric wires (not shown) routed across the grille. In the illustrated embodiment, the light unit 114 is controlled by a pull-chain switch 160 mounted on the light unit itself; however in other embodiments, the light unit can be operated by a remote switch.

Referring now to FIG. 4, there is illustrated a cross-sectional side view of another exemplary box fan apparatus 200 in accordance with the disclosure. Unless otherwise described, the elements of the fan apparatus 200 are substantially identical to those of fan apparatus 100, and therefore are referred to with identical reference numbers. For purposes of illustration, the grille 112 and the optional light assembly 114 are not shown in FIG. 4, but are shown in broken line in FIG. 5.

The fan apparatus 200 includes a cylindrical housing/shroud 210 of circular cross-section. The housing 210 includes a central portion 212 having a first axial length, denoted $L_C$, wherein the inner wall 154 lies at a constant first radius from the central axis 118, denoted $R_{H1}$. A rear lip portion 214 is connected to a rear edge of the central portion 212, the rear lip portion extending radially from the first radius to a second radius from the central axis 118, denoted $R_{H2}$, wherein the second radius $R_{H2}$ is greater than the first radius $R_{H1}$. A flare portion 216 is connected to a front edge of the central portion 212, the flare portion extending, when viewed in cross section along a plane through the central axis 118, axially frontward a second axial length, denoted $L_F$, and radially outward at an angle denoted $\theta_F$, from the front edge of the central portion to a third radius from the central axis 118, denoted $R_{H3}$, wherein the third radius $R_{H3}$ is greater than the first radius $R_{H1}$. In the illustrated embodiment, the axial length $L_C$ of the central portion 212 of the housing is 10.5 inches, the axial length $L_F$ of the flare portion 216 of the housing is 2.0 inches, and the flare portion extends outward at an angle $\theta_F$ of 45 degrees relative to the central portion 212 or central axis 118. In other embodiments, the axial length $L_C$ of the central portion 212 is within the range from 10.0 inches to is 11.0 inches, the axial length $L_F$ of the flare portion 216 is within the range from 1.9 inches to 2.5 inches, and the flare portion angle $\theta_F$ is within the range from 43 degrees to 47 degrees In the fan apparatus 200, a maximum radial extent ("blade tip radius") of the fan blades 126 from the central axis 118, denoted $R_B$, defines a outer diameter, denoted $OD_B$, where $OD_B=(2 \times R_B)$ of the blade assembly. A blade clearance, or minimum radial distance between the blade tips 134 and the inner surface 154 of the housing is denoted $D_{BC}$ where $D_{BC}=(R_{H1}-R_B)$. In the illustrated embodiment, the central portion radius $R_{H1}$ is 16.0 inches, the flare portion radius (max.) $R_{H3}$ is 18.0 inches and the blade tip radius $R_B$ is 15.75 inches, such that the blade tip clearance $D_{BC}$ is 0.25 inches. In another embodiment, the central portion radius $R_{H1}$ is 28.0 inches, the flare portion radius (max.) $R_{H3}$ is 30.0 inches, and the blade tip radius $R_B$ is 29.0 inches, such that the blade tip clearance $D_{BC}$ is 1.0 inches. In other embodiments, wherein the central portion radius $R_{H1}$ is within the range from 10 inches to 16 inches, the blade tip clearance $D_{BC}$ is within the range from 0.225 inches to 0.275 inches. In further embodiments, wherein 16 inches<$R_{H1}$<=28 inches, the blade tip clearance $D_{BC}$ is within the range from 0.90 inches to 1.10 inches.

In the fan apparatus 200, at least a portion of the fan blades 126, typically portions of the blade tip 134 and/or leading edge 136, extends axially past the front edge 150 of the housing 110. A greatest axial extension of the blades 126 past the front edge 150 defines a blade protrusion distance, denoted $D_{BP}$. For example, in some embodiments the housing 210 has a central portion 212 with inner wall $R_{H1}$ within the range from 10 inches to 16 inches, the blade protrusion distance $D_{BP}$=1.25 inches. In other embodiments, wherein 16 inches<$R_{H1}$<=28 inches, the minimum blade clearance $D_{BP}$=1.00 inches.

Figure 7:
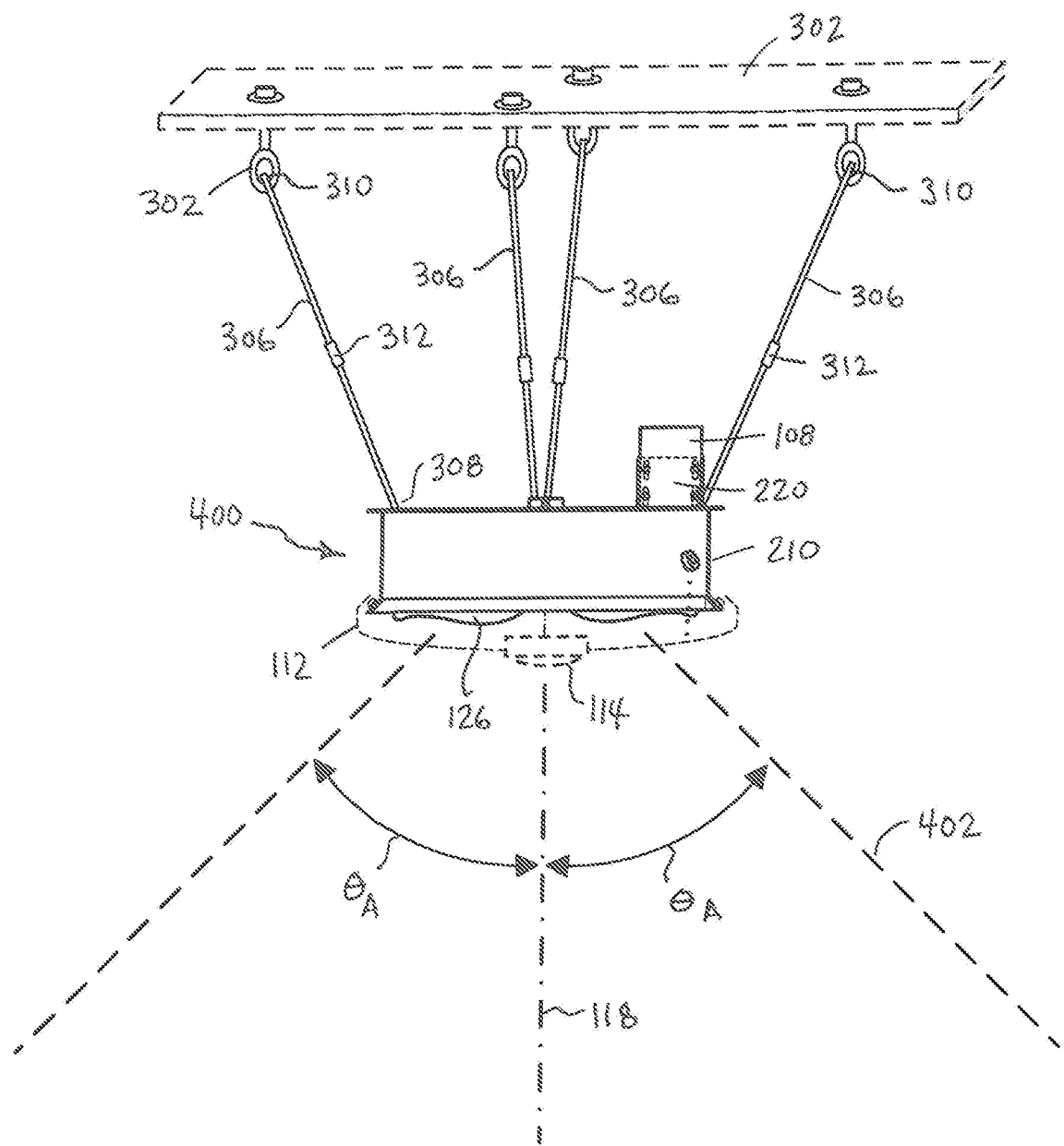
FIG. 7 shows a side view of a box fan assembly in accordance with the disclosure illustrating the airflow path exiting the fan outlet.

Referring still to FIG. 4, the fan blades 126 can have a widened tip 134 that serves to initiate a funnel-shaped outlet airflow (see FIG. 7). The widened tip can be described by considering the chord of the blade (i.e., the length along the surface of the blade at a given radius from the central axis 118) as it varies with the radial distance from the blade root 132. In some embodiments, as the radial distance increases from the blade root 132 toward the blade tip 134, the chord increases to a first local maximum 226, then decreases to a local minimum 228, and then increases again to second local maximum 230 proximal to the blade tip. This local maximum chord 230 near the blade tip 134 can be considered a widened blade tip.

Figure 5:
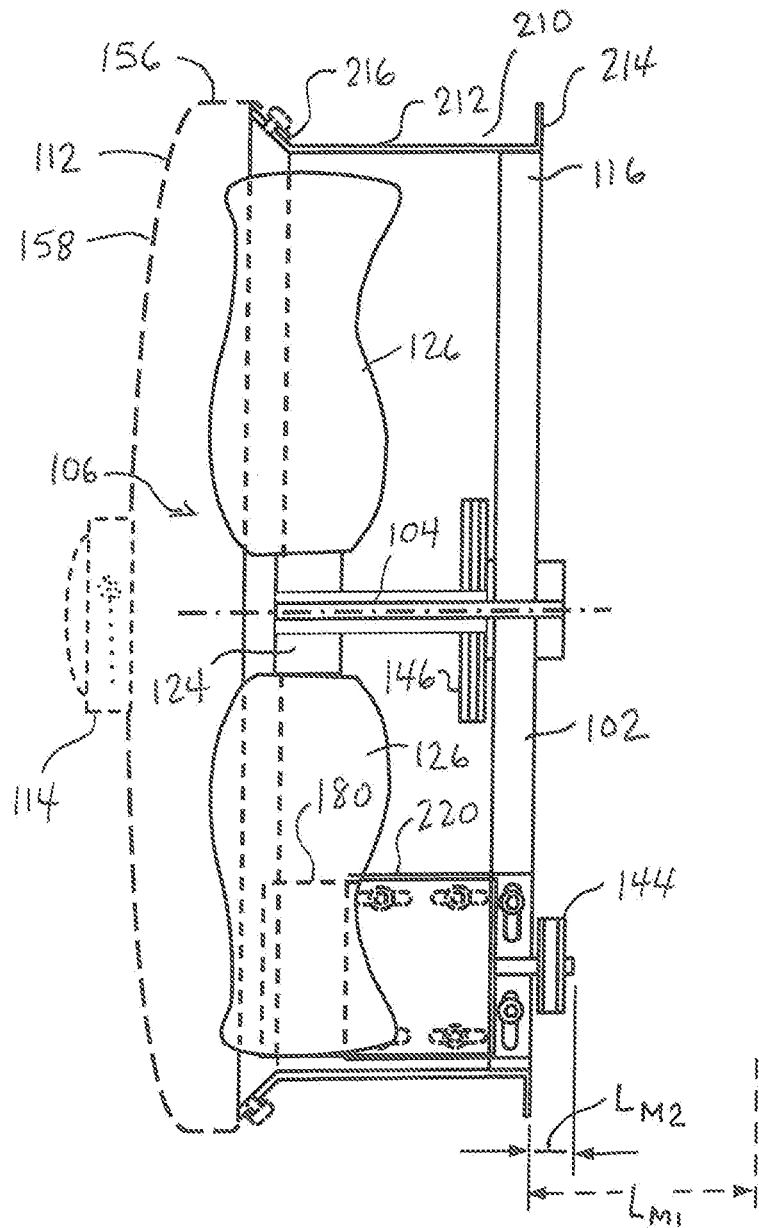
FIG. 5 shows a cross-sectional side view of the box fan apparatus of FIG. 4 with the motor assembly mounted in the shipping position.

Referring still to FIG. 4, and now also to FIG. 5, additional aspects of the fan apparatus 200 are illustrated. To facilitate mounting of the electric motor 108 to the frame 102, the electric motor can be mounted to a mounting plate 220. In the illustrated embodiment, bolts 222 extending through holes 224 in the mounting plate 220 are used to connect the electric motor 108 to the mounting plate, and additional bolts extending through additional holes are used to connect the mounting plate to the frame 102. The holes 224 in the mounting plate 220 can be slotted to allow for axial and radial adjustment of the position of the electric motor 108 relative to the frame 102, e.g., for proper alignment and tensioning of the drive belt 148. FIG. 4 illustrates the electric motor 108 mounted in an operational configuration such that the motor pulley 144 is aligned with the hub pulley 146, and such that the electric motor does not interfere with rotation of the blade assembly 106. In this operational (i.e., first) configuration, portions of the electrical motor 108 extend a distance, denoted $L_{M1}$, axially to the rear of the frame 102 or rear edge 152 of the housing. If the fan is shipped in this configuration, the relevant dimension of the shipping container must be increased to accommodate distance $L_{M1}$. In some embodiment, the motor mounting plate 220 is configured to be reversible when connected to the electric motor 108, i.e., it is connectable to the frame 102 in one of two configurations.

Referring now specifically to FIG. 5, in the illustrated embodiment, the mounting plate 220 is of the reversible type and is attached to the frame 102 in a second configuration. The electrical motor 108 is still connected to the mounting plate 220 using the same bolts 222 and slotted holes 224, however, in this shipping (i.e., second) configuration, portions of the electrical motor extend a reduced distance, denoted $L_{M2}$, axially to the rear of the frame 102 or rear edge 152 of the housing. If the fan 200 is shipped in this second configuration, the relevant dimension of the shipping container can be decreased by a savings distance, denoted $L_{SV}$, where $L_{SV}=(L_{M1}-L_{M2})$. In the second configuration, the electric motor 108 protrudes axially between the fan blades 126 of the blade assembly 106, thus interfering with rotation of the blade assembly; however, the electric motor is still firmly connected to the frame 102 to avoid damage during transport without requiring separate packing of the electric motor.

Figure 6:
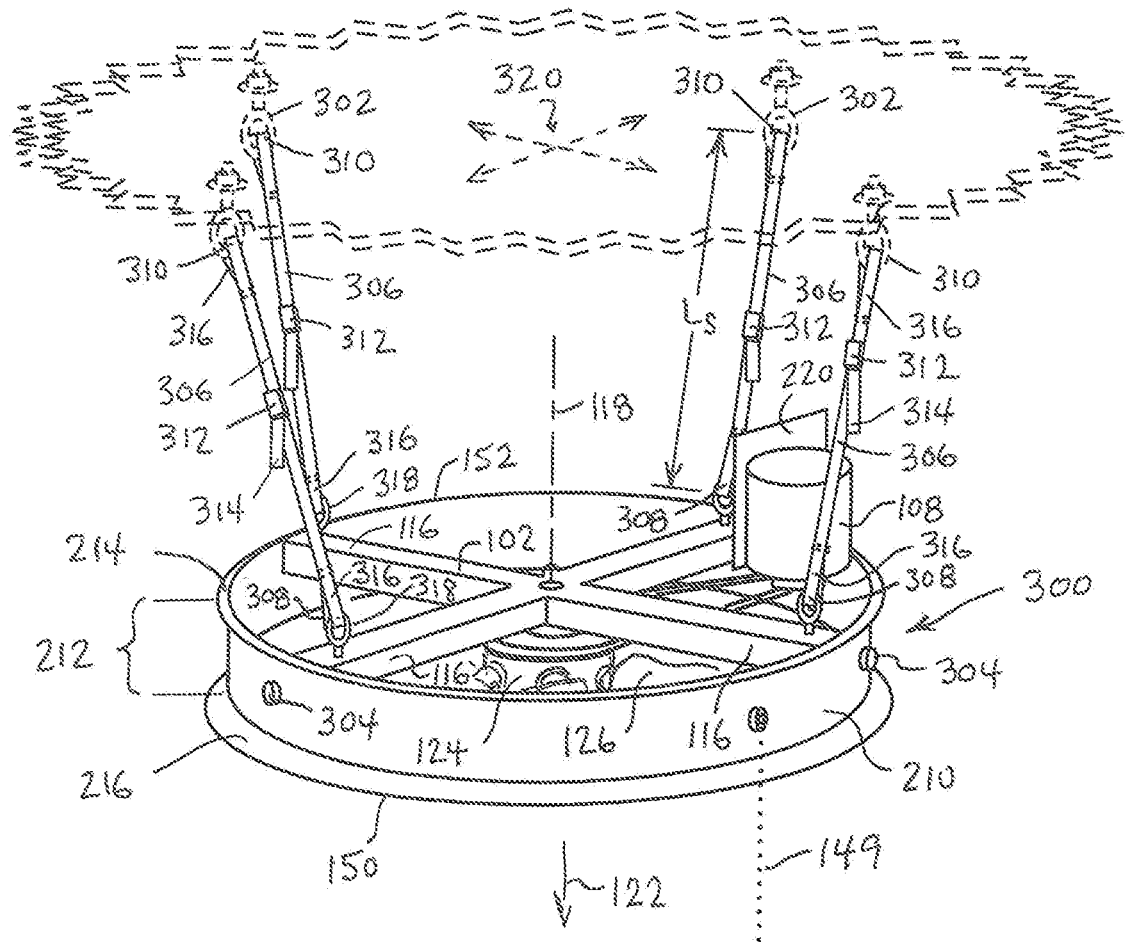
FIG. 6 shows a top perspective view of yet another exemplary box fan apparatus including a multi-adaptive suspension in accordance with the disclosure.

Referring now to FIG. 6, there is illustrated a top perspective view of another exemplary box fan apparatus 300 suspended from a ceiling structure 302 in accordance with the disclosure. Unless otherwise described, the elements of fan apparatus 300 are substantially identical to those of fan apparatus 100 and 200, and therefore are referred to with identical reference numbers. The front grille 112 and rear grille are not shown in FIG. 6 for purposes of illustration. The fan apparatus 300 has a frame 102 including four frame arms 116 of equal length connected in a cross-shaped configuration, i.e., each frame arm extends radially from an inner end proximal to the central axis 118 to an outer end distal from the central axis. In other embodiments, the frame can be configured in a three-pointed star shape, a five-pointed star shape, or a N-pointed star shape. In the illustrated embodiment, the housing/shroud 110 is connected to the frame 102 only at the outer ends of the frame arms 116, e.g., using bolts 304 passing through holes in the housing.

The fan apparatus 300 further includes at least three suspension elements 306 formed from a flexible material. Each suspension element 306 has a first end 308, a second end 310 and an adjustment mechanism 312 mounted along the suspension element between the first and second ends. Each adjustment mechanism 312 is operable to change a length, denoted $L_S$, of suspension element 306 between the first end 308 and second end 310. The adjustment mechanism 312 can be a strap adjuster, slide, tri-glide, D-rings, slide-release buckle, clip, or any type of conventional adjustment mechanism for straps or ropes. Further, the suspension element 306 may comprise an assembly of multiple separate strap portions connected together by the adjustment mechanism 312 to form a two-ended strap assembly. In the illustrated embodiment of FIG. 6, four suspension elements 306 are provided, and the length $L_S$ of the suspension elements 306 can be adjusted by pulling or backing-off a free end 314 of the strap portion threaded through a slide mechanism 312.

In some embodiments, the flexible material of the suspension elements is a strap or rope of woven synthetic fiber such as (but not limited to) polyamide (nylon), polyester or aramid (e.g, Kevlar) fiber. In some embodiments, the first end 308 and/or the second end 310 of each suspension member can form a loop 316.

The first end 308 of each suspension member is attached to the fan apparatus 300. In some embodiments, the suspension members 306 are attached only to the frame 102. In the illustrated embodiment, one suspension member 306 is connected at the first end 308 to each frame arm 116 near the outer end of the frame arm using an eye bolt 318. The second ends 310 of the suspension members are connected to the ceiling structure 302. The second ends 310 of the suspension members 306 can be connected to the ceiling structure 302 at a single point; however, it is preferred to connect the suspension members to multiple, spaced-apart points of the ceiling structure to minimize any torque-induced twisting. In the illustrated embodiment, each of the loops 316 at the second ends 310 of the suspension members 306 is attached to a different eye bolt 302 representing the ceiling structure. In other embodiments, the suspension members 306 can be looped over the ceiling structure 302. The ceiling structure 302 defines a ceiling plane 320 (shown in broken line) above the suspended fan apparatus 300.

Since the suspension elements 306 are flexible, a minimum of three suspension elements, connected to three different points on the fan apparatus 300, are necessary to hold the fan apparatus 300 in a stable orientation. If four suspension elements 306 are connected to four equally-spaced points on the fan apparatus 300, this will allow orientation adjustment of the fan apparatus 300 along two independent axes relative to the ceiling plane 320. As previously described, only one attachment point to the ceiling structure 302 is required for the second ends of the attachment members 306 to hold the fan apparatus 300 in a stable orientation.

When the fan apparatus 300 is suspended from the ceiling structure 302 using the at least three suspension elements 306 as described, a distance between a ceiling plane 320 (i.e., defined by the ceiling structure 302) and the frame 102 can be adjusted without changing the orientation of the of the central axis 118 relative to the ceiling plane by using the respective adjustment mechanisms 312 to change the respective lengths of all of the respective suspension elements by a same amount. Further, the orientation of the central axis 118 relative to the ceiling plane 320 can be adjusted (i.e., to change the air flow direction 122) without changing the distance between the ceiling plane and the frame 102 by using the respective adjustment mechanisms 312 to change the respective lengths of each of the respective suspension elements 306 by respective different amounts. In most cases, the height and orientation of the fan apparatus 300 can be easily adjusted without requiring tools. For example, in the illustrated embodiment of FIG. 6, the height and orientation of the fan apparatus 300 can be adjusted simply by pulling and backing-off the free ends 314 of the relevant suspension members 306.

Referring now to FIG. 7, there is illustrated a side view of another box fan apparatus 400 according to the disclosure, illustrating the airflow path exiting the fan outlet. The box fan apparatus 400 is shown suspended from a ceiling structure 302 in accordance with the disclosure. Unless otherwise described, the elements of fan apparatus 400 are substantially identical to those of fan apparatus 100, 200 and 300, and therefore are referred to with identical reference numbers. The combination of flared shroud shape, blade end clearance, blade shape and/or blade protrusion produces a funnel-shaped outlet air flow pattern 402 that travels outward from the front edge 150 of the housing at an angle, denoted $\theta_A$, of about 45 degrees on each side of the central axis 118. In various embodiments, the angle $\theta_A$ of the outlet airflow pattern 402 is within the range from 43 degrees and 47 degrees on each side of the central axis 118.

For purposes of explanation, dimensional data for three exemplary fan apparatus designs are provided in Table 1.

Such dimensional data represents tested designs, but apparatus in accordance with the disclosure are not limited to these dimensions.

TABLE 1

Dimensions for Three Exemplary Fan Apparatus

| Fan Example | Small | Medium | Large |
|---|---|---|---|
| Housing inner radius (constant radius portion) (in.) | 10 | 16 | 28 |
| Housing inner diameter (constant radius portion) (in.) | 20 | 32 | 56 |
| Housing inner radius (max flare portion) (in.) | 12 | 18 | 30 |
| Housing inner diameter (max flare portion) (in.) | 24 | 36 | 60 |
| Housing: axial length of constant radius portion (in.) | 10.5 | 10.5 | 10.5 |
| Housing: axial length of flare portion (in.) | 2.0 | 2.0 | 2.0 |
| Housing axial length - overall front to back edge (in.) | 12.5 | 12.5 | 12.5 |
| Fan blade clearance (tip to housing) minimum value | 0.25 | 0.25 | 1.00 |
| Forward blade protrusion from housing(in.) | 1.25 | 1.25 | 1.00 |
| Suspended weight of fan apparatus with motor (lbs.) | 54 | 63 | 118 |

It will be appreciated by those skilled in the art having the benefit of this disclosure that this box fan apparatus with multi-adaptive suspension provides many advantages over conventional box fans. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An air-circulating fan apparatus for suspending from a ceiling structure of a building, wherein the ceiling structure defines a ceiling height and a ceiling plane, the fan apparatus comprising:
    a frame;
    an elongated central shaft mounted to the frame, the central shaft having a central axis defining an axial direction;
    three or more suspension elements formed from a flexible material, wherein each respective suspension element has a respective first end, a respective second end and a respective adjustment mechanism mounted between the respective first and second ends, wherein each respective first end is attached to a respective different portion of the frame and wherein each respective adjustment mechanism is operable to change a length of the respective suspension element between the respective first and second ends;
    wherein the frame can be suspended from the ceiling structure by attaching the respective second ends of the suspension elements to the ceiling structure;
    wherein the distance between the ceiling plane and the frame can be adjusted without changing the orientation of the central axis relative to the ceiling plane by using the respective adjustment mechanisms to change the respective lengths of all of the respective suspension elements by a same amount, and
    wherein the orientation of the central axis relative to the ceiling plane can be adjusted without changing the distance between the ceiling plane and the frame by using the respective adjustment mechanisms to change the respective lengths of each of the respective suspension elements by respective different amounts;
    a blade assembly mounted on the central shaft to be rotatable around the central axis and defining a turning direction and an air flow direction, the rotating blade assembly including:
        a central hub mounted on the central shaft for rotation around the central axis in the turning direction;
        a plurality of fan blades rigidly mounted to the central hub and extending radially away from the central axis, each blade having a front blade surface facing in the air flow direction and a rear blade surface facing opposite to the air flow direction, wherein the front blade surface is bounded by a blade root disposed along a radially innermost edge of the blade, a blade tip disposed along a radially outermost edge of the blade, a leading edge extending between the blade tip and the blade root along the turning direction edge of the blade and a trailing edge extending between the blade tip and the blade root along an edge opposite the turning direction edge;
    an electric motor mounted to the frame and operatively connected to the central hub to rotate the rotating blade assembly around the central axis; and
    a cylindrical housing mounted to the frame with a front edge facing in the air flow direction, a rear edge facing opposite to the air flow direction and having, when viewed in the axial direction, an inner surface with a circular cross-section having a center located on the central axis; and
    wherein at least a portion of the fan blades extend past the front edge of the housing in the axial direction, and the greatest axial extension of the blades defines a blade protrusion distance ($D_{BP}$);
    wherein the cylindrical housing further comprises:
        a central portion having a first axial length wherein an inner wall lies at a constant first radius from the central axis;
        a rear lip portion connected to a rear edge of the central portion, the rear lip portion extending radially from the first radius to a second radius, wherein the second radius is greater than the first radius; and
        a flare portion connected to a front edge of the central portion, the flare portion extending, when viewed in cross section along a plane through the central axis, axially frontward a second axial length and radially outward at an angle within the range from 43 degrees to 47 degrees from the front edge of the central portion to a third radius, wherein the third radius is greater than the first radius.

2. The fan apparatus according to claim 1, wherein each suspension element includes a first loop formed on the respective first end and a second loop formed on the respective second end.

3. The fan apparatus according to claim 1, wherein the suspension elements are formed from a woven synthetic fiber material.

4. The fan apparatus according to claim 1, wherein the electric motor is operatively connected to the central hub by a flexible belt.

5. The fan apparatus according to claim 4, further comprising a reversible motor mount plate connected to the electric motor and connectable to the frame in one of two configurations, wherein:
when the reversible motor mount plate is connected to the frame in a first configuration, the electric motor extends axially a first distance from the rear edge of the housing and the electric motor is positioned to not interfere with rotation of the rotating blade assembly; and
when the reversible motor mount plate is connected to the frame in a second configuration, the electric motor extends axially a second distance from the rear edge of the housing, wherein the second distance is less than the first distance, and the electric motor is positioned to interfere with rotation of the rotating blade assembly.

6. The fan apparatus according to claim 1, wherein:
the first axial length of the central portion of the housing is in the range of 10 inches to 11 inches; and
the second axial length of the flare portion is in the range from 1.9 inches to 2.1 inches.

7. The fan apparatus according to claim 6, wherein:
a blade clearance distance ($D_{BC}$) is within the range from 0.25 inches to 1.00 inches; and
the blade protrusion distance ($D_{BP}$) is within the range from 1.00 inches to 1.25 inches.

8. The fan apparatus according to claim 7, wherein the first radius of the central portion, the first axial length of the central portion, the second axial length of the flare portion, the $D_{BC}$ and the $D_{BP}$ cause a funnel shape outlet air flow pattern that travels outward from the front edge of the housing at an angle relative to the central axis within the range from 43 degrees and 47 degrees.

9. The fan apparatus according to claim 1, wherein:
the frame is configured to have three or more frame arms of equal length, each frame arm extending radially from an inner end proximal to the central axis to an outer end distal from the central axis;
each respective suspension element is connected to a different one of the three or more frame arms at a respective point on the frame arm proximal to outer end of the frame arm; and
the housing is connected to the frame only at the outer ends of the frame arms.

10. The fan apparatus according to claim 9, wherein the frame includes three frame arms configured in a three-pointed star shape and there are three suspension elements.

11. The fan apparatus according to claim 9, wherein the frame includes four frame arms configured in a cross shape and there are four suspension elements.

12. An air-circulating fan apparatus for suspending from a ceiling structure of a building, wherein the ceiling structure defines a ceiling height and a ceiling plane, the fan apparatus comprising:
a frame having four frame arms joined at respective inner ends and extending to respective outer ends in a cross configuration;
an elongated central shaft mounted to the frame proximal to the inner ends of the frame arms, the central shaft having a central axis defining an axial direction;
a blade assembly mounted on the central shaft to be rotatable around the central axis and defining a turning direction and an air flow direction, the rotating blade assembly including:
a central hub mounted on the central shaft for rotation around the central axis in the turning direction;
a plurality of fan blades rigidly mounted to the central hub and extending radially away from the central axis;
an electric motor mounted to the frame and operatively connected to the central hub to rotate the rotating blade assembly around the central axis;
a cylindrical shroud mounted to the outer ends of the frame arms, the shroud including a front edge facing in the air flow direction, a rear edge facing opposite to the air flow direction and having, when viewed in the axial direction, an inner surface with a circular cross-section having a center located on the central axis;
a central portion having a first axial length wherein an inner wall lies at a constant first radius from the central axis; and
a flare portion connected to a front edge of the central portion, the flare portion extending, when viewed in cross section along a plane through the central axis, axially frontward a second axial length and radially outward at an angle within the range from 43 degrees to 47 degrees from the front edge of the central portion to a third radius, wherein the third radius is greater than the first radius;
wherein at least a portion of the fan blades extend past the front edge of the housing in the axial direction; and
four suspension elements formed from a flexible material, wherein each respective suspension element has a respective first end attached to a different one of the four frame arms, a respective second end, and a respective adjustment mechanism mounted between the respective first and second ends, each respective adjustment mechanism being operable to change a length of the respective suspension element between the respective first and second ends;
wherein the frame can be suspended from the ceiling structure by attaching the respective second ends of the suspension elements to the ceiling structure;
wherein the distance between the ceiling plane and the frame can be adjusted without changing the orientation of the central axis relative to the ceiling plane by using the respective adjustment mechanisms to change the respective lengths of all of the respective suspension elements by a same amount, and
wherein the orientation of the central axis relative to the ceiling plane can be adjusted without changing the distance between the ceiling plane and the frame by using the respective adjustment mechanisms to change the respective lengths of each of the respective suspension elements by respective different amounts.

13. The fan apparatus according to claim 12, wherein the profile of each fan blade includes a widened tip exhibiting the following variation of a chord length with increasing radial distance from the blade root:
the chord length increases to a first local maximum as the radial distance increases; the chord length, after the first local maximum, decreases to a local minimum as the radial distance continues to increase, and
the chord length, after the local minimum, increases again to a second local maximum proximal to the blade tip as the radial distance continues to increase.

* * * * *